United States Patent
Lee

(10) Patent No.: US 8,015,579 B2
(45) Date of Patent: Sep. 6, 2011

(54) BROADCAST SIGNAL PROCESSING APPARATUS AND CONTROL METHOD THEREOF

(75) Inventor: Chul-Mok Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 432 days.

(21) Appl. No.: 11/866,469

(22) Filed: Oct. 3, 2007

(65) Prior Publication Data

US 2008/0172691 A1 Jul. 17, 2008

(30) Foreign Application Priority Data

Jan. 15, 2007 (KR) .......................... 10-2007-0004379

(51) Int. Cl.
*H04N 5/455* (2006.01)
(52) U.S. Cl. .............. 725/38; 725/382; 725/47; 725/52; 725/132; 725/140
(58) Field of Classification Search ............. 725/38, 725/47, 52, 132, 140, 152
See application file for complete search history.

(56) References Cited

U.S. PATENT DOCUMENTS

| | | | | |
|---|---|---|---|---|
| 5,801,785 | A * | 9/1998 | Crump et al. | 348/563 |
| 6,437,811 | B1 * | 8/2002 | Battles et al. | 715/835 |
| 2007/0058047 | A1 * | 3/2007 | Henty | 348/211.99 |
| 2008/0043031 | A1 * | 2/2008 | Jagmag | 345/581 |

FOREIGN PATENT DOCUMENTS

| | | |
|---|---|---|
| KR | 10-2003-0050891 A | 6/2003 |
| KR | 10-2004-0003601 A | 1/2004 |
| KR | 10-2005-0052927 A | 6/2005 |
| KR | 10-2005-0078690 A | 8/2005 |

\* cited by examiner

*Primary Examiner* — Joseph P Hirl
*Assistant Examiner* — Jivka Rabovianski
(74) *Attorney, Agent, or Firm* — Sughrue Mion, PLLC

(57) ABSTRACT

A broadcasting signal processing apparatus includes: a signal receiver which receives a broadcasting signal, the broadcast signal including an application program for providing broadcasting information; a signal processor which processes the broadcasting signal so that a video is displayed based on the broadcasting signal received by the signal receiver; and a controller which controls the signal processor so that execution of the application program is paused and the video is adjusted if an adjustment condition of the video being displayed is satisfied while the application program is executed.

24 Claims, 6 Drawing Sheets

BROADCAST SIGNAL PROCESSING APPARATUS AND CONTROL METHOD THEREOF

CROSS-REFERENCE TO RELATED APPLICATION

This application claims priority from Korean Patent Application No. 10-2007-0004379, filed on Jan. 15, 2007 in the Korean Intellectual Property Office, the disclosure of which is incorporated herein by reference.

BACKGROUND OF THE INVENTION

1. Field of the Invention

Apparatuses and methods consistent with the present invention relate to a broadcasting signal processing apparatus and a control method thereof, and more particularly, to a broadcasting signal processing apparatus that executes an application program included in a broadcasting signal, and a control method thereof.

2. Description of the Related Art

A broadcasting signal processing apparatus, such as a TV or a set-top box, receives a broadcasting signal from a broadcasting station and processes the broadcasting signal so that a video is displayed based on the broadcasting signal.

The broadcasting signal may include an application program that provides various broadcasting services, such as data broadcasting, and that broadcasts information. For example, the application program may include a Java application that is defined in digital TV broadcasting specifications such as OpenCable Application Platform (OCAP), Advanced Common Application Platform (ACAP), and Multimedia Home Platform (MHP).

Such an application program is downloaded to the broadcasting signal processing apparatus through the received broadcasting signal, and the broadcasting signal processing apparatus provides various broadcasting information by executing the downloaded application program.

However, the broadcasting signal processing apparatus can perform only the functions provided by the application program during execution of the application program. That is, if a user-desired function is not included in the application program in advance, the broadcasting signal processing apparatus cannot perform the user-desired function during execution of the application program.

Hereinafter, detailed descriptions will be given with examples. The broadcasting signal processing apparatus provides broadcasting information by displaying a graphical user interface (GUI) of an application program. FIG. 1 shows a screen 1 where a GUI 3 of an application program is displayed by a broadcasting signal processing apparatus.

When the application program is executed, a broadcasting signal video (hereinafter will be referred to as "video") 2 can be displayed on an upper left portion of the screen 1 and the GUI 3 of the application program can be displayed on the other portion of the screen 1.

In this case, a user may want to display the video 2, which is displayed on only a portion of the screen 1, over the full screen. However, when the application program does not have a function that allows adjusting of the size of the video 2, the application program must be terminated in order to adjust the size of the video 2 while the application program is being executed.

In addition, when a user wants to use broadcasting information of the terminated application program, the application program needs to be restarted. In this case, the previous execution information of the application program is lost. Therefore, previous operations must be performed again in order to use the broadcasting information.

The above information disclosed in this Background section is only for enhancement of understanding of the background of the invention and therefore it may contain information that does not form the prior art that is already known in this country to a person of ordinary skill in the art.

SUMMARY OF THE INVENTION

The exemplary embodiment of the present invention overcomes the above disadvantages and other disadvantages not described above. Also, the present invention is not required to overcome the disadvantages described above.

Accordingly, the exemplary embodiment provides a broadcasting signal processing apparatus and a control method that performs a user-desired function without terminating an application program.

Particularly, the exemplary embodiment provides a broadcasting signal processing apparatus and a control method that more conveniently performs a user-desired function during execution of an application program.

The foregoing and/or other aspects of the present invention can be achieved by providing a broadcasting signal processing apparatus comprising: a signal receiver which receives a broadcasting signal, the broadcast signal including an application program for providing broadcasting information; a signal processor which processes the broadcasting signal so that a video is displayed based on the broadcasting signal received by the signal receiver; and a controller which controls the signal processor so that execution of the application program is paused and the video is adjusted if an adjustment condition of the video being displayed is satisfied while the application program is executed.

According to an aspect of the invention, the broadcasting signal processing apparatus further comprises a user input unit to which a user's instruction to adjust the video is input, wherein the controller determines that the adjustment condition of the video being displayed is satisfied when the user's instruction is input.

According to an aspect of the invention, the user input unit comprises a remote controller or a control panel, the remote controller or control panel including at least one button, and wherein the controller determines that the user's instruction is input when the at least one button is pressed.

According to an aspect of the invention, the controller changes a current state of the application program from an execution state to a pause state by calling a function of the application program that pauses the execution of the application program.

According to an aspect of the invention, adjustment of the video includes adjusting a size of the video.

According to an aspect of the invention, the broadcasting information comprises a graphic user interface (GUI) that displays the broadcasting information.

According to an aspect of the invention, the controller resumes execution of the paused application program.

According to an aspect of the invention, the broadcasting signal processing apparatus further comprises a user input unit to which a user's instruction to resume the paused application program is input, wherein the controller resumes the paused application program when the user's instruction is input.

According to an aspect of the invention, the controller controls the signal processor so that the video is restored prior to adjustment if the application program is resumed.

According to an aspect of the invention, the controller calls a function of the application program that changes a current state of the application program from a pause state to an execution state in order to resume the paused application program.

According to an aspect of the invention, the broadcasting signal processing apparatus further comprises a display unit which displays a video based on the broadcasting signal processed by the signal processor.

The foregoing and/or other aspects of the present invention can be achieved by providing a control method of a broadcasting signal processing apparatus having a signal receiver that receives a broadcasting signal, the broadcasting signal including an application program for providing broadcasting information, and a signal processor that processes the broadcasting signal so that a video is displayed based on the broadcasting signal received by the signal receiver, the control method comprising: determining whether an adjustment condition of the video being displayed is satisfied while the application program is executed; pausing the execution of the application program if the adjustment condition of the video being displayed is satisfied; and controlling the signal processor so that the video being displayed is adjusted while the application program is paused.

According to an aspect of the invention, the control method further comprises receiving a user's instruction for adjusting the video, wherein it is determined that the adjustment condition of the video being displayed is satisfied if the user's instruction is input.

According to an aspect of the invention, the pausing of the execution of the application program comprises calling a function of the application program so as to change a current state of the application program from an execution state to a pause state.

According to an aspect of the invention, the adjustment of the video comprises adjusting a size of the video.

According to an aspect of the invention, the providing of the broadcasting information comprises displaying a graphic user interface (GUI) for the broadcasting information.

According to an aspect of the invention, the control method further comprises resuming the execution of the paused application program.

According to an aspect of the invention, the resuming of the execution of the paused application program comprises: receiving a user's instruction for resuming the execution of the paused application program; and resuming the execution of the paused application program if the user's instruction is input.

According to an aspect of the invention, the resuming of the execution of the paused application program further comprises controlling the signal processor so that the video is restored prior to adjustment.

According to an aspect of the invention, the resuming of the execution of the paused application program further comprises calling a function of the application program so as to change a current state of the application program from a pause state to an execution state.

BRIEF DESCRIPTION OF THE DRAWINGS

The above and/or other aspects of the prevent invention will become apparent and more readily appreciated from the following description of the exemplary embodiment, taken in conjunction with the accompanying drawings, in which.

DETAILED DESCRIPTION OF EXEMPLARY EMBODIMENT OF THE INVENTION

Figure 1:
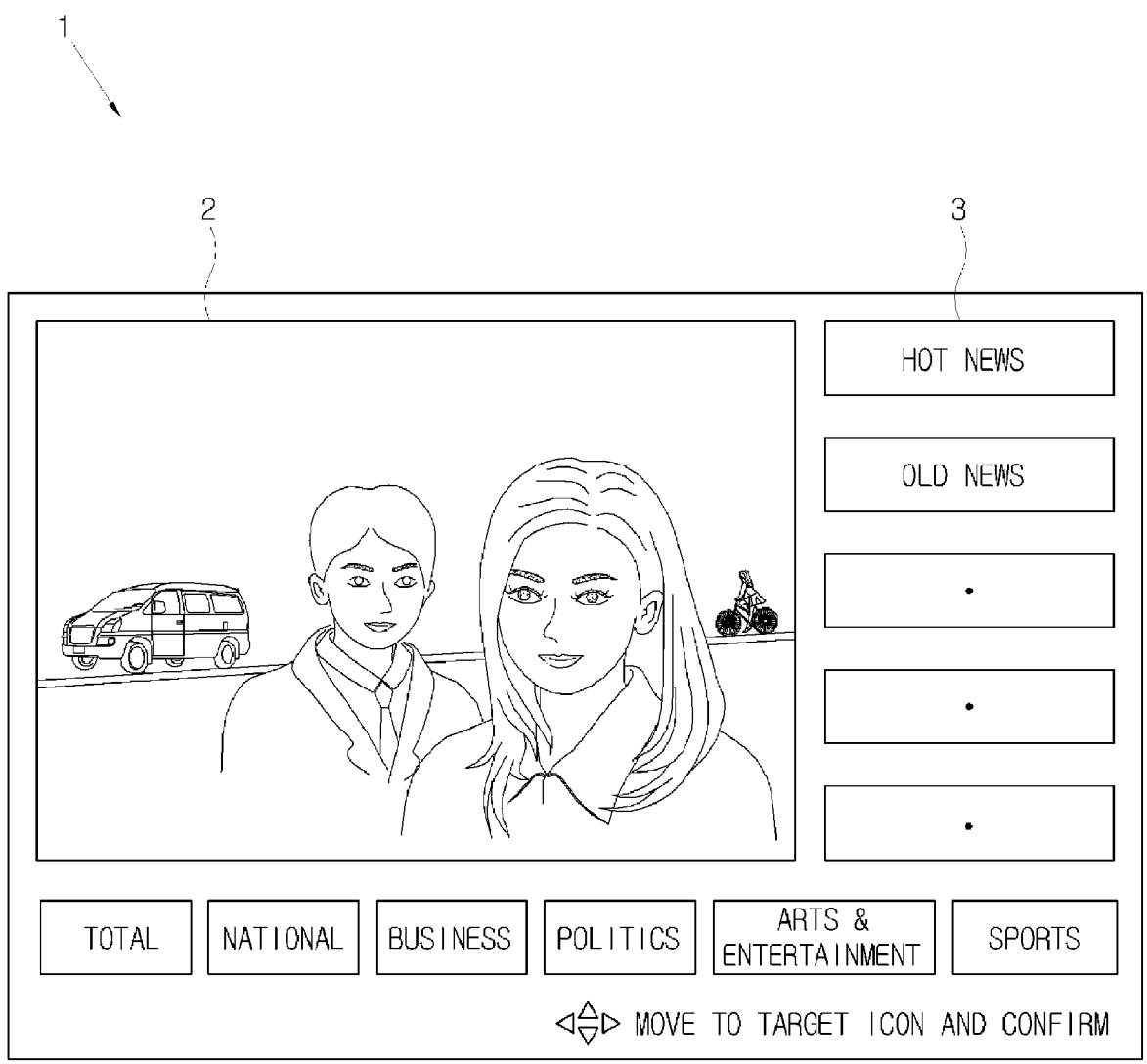
FIG. 1 shows a screen where a GUI of an application program is displayed by a broadcasting signal processing apparatus.

Reference will now be made in detail to an embodiment of the present invention, examples of which are illustrated in the accompanying drawings, wherein like reference numerals refer to like elements throughout. The exemplary embodiment is described below so as to explain the present invention by referring to the figures.

Hereinafter, the exemplary embodiment of the present invention will be described in detail with reference to the accompanying drawings.

Figure 2:
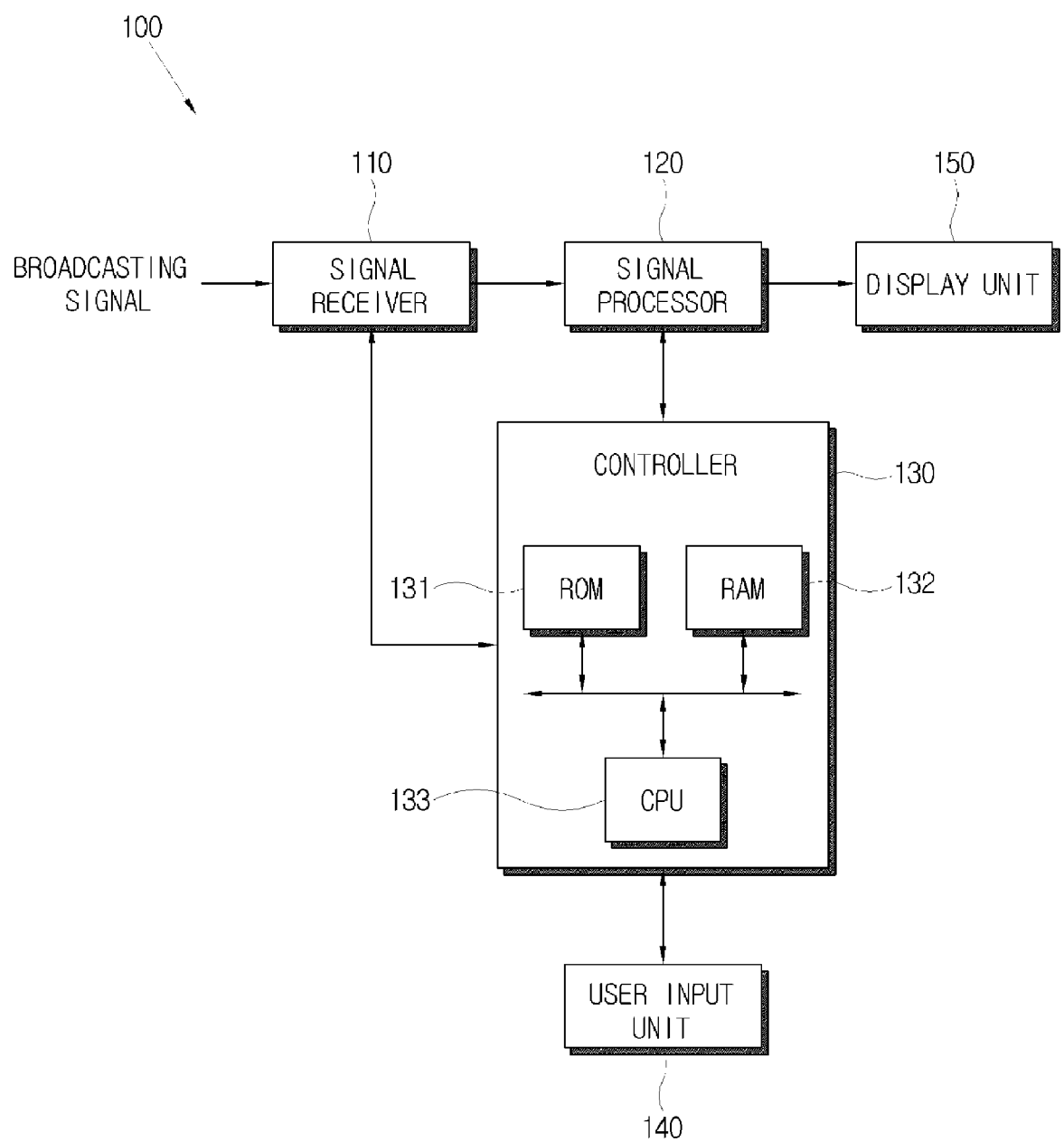
FIG. 2 is a block diagram of a broadcasting signal processing apparatus according to a first exemplary embodiment of the present invention.

FIG. 2 is a block diagram of a broadcasting signal processing apparatus 100 according to the exemplary embodiment of the present invention.

The broadcasting signal processing apparatus 100 may be a TV or a set-top box that receives a broadcasting signal from a broadcasting station and processes the received signal so that a video is displayed based on the received broadcasting signal.

The broadcasting signal includes an application program that provides various broadcasting information such as data broadcasting. Such an application program can be provided as a Java application defined in a specification associated with digital TV broadcasting, such as OpenCable Application Platform (OCAP), Advanced Common Application Platform (ACAP), and Multimedia Home Platform (MHP).

The broadcasting signal processing apparatus 100 can adjust a video or perform other functions without terminating the application program that is currently being executed. For example, the broadcasting signal processing apparatus 100 can adjust the size of the video according to instructions of a user during execution of the application program.

In further detail, as shown in FIG. 2, the broadcasting signal processing apparatus 100 includes a signal receiver 110 that receives a broadcasting signal, a signal processor 120 that processes the received broadcasting signal so that a video is displayed based on the broadcasting signal, and a controller 130 that controls the signal processor 120 so that execution of the application program is temporarily paused in order to adjust the video if at least one adjustment condition of the video being displayed is satisfied while broadcasting information is provided by the execution of the application program.

The signal receiver 110 performs frequency tuning to one of a plurality of channels according to control of the controller 130 and, therefore, receives the broadcasting signal.

The signal processor 120 performs demultiplexing or decoding of the broadcasting signal received by the signal receiver 110. The signal processor 120 adjusts the displayed video according to control of the controller 130.

When it is determined that the receiving of the application program by the signal receiver 110 is completed, the controller 130 can start the application program. In this case, as shown in FIG. 1, the GUI 3 of the application program can be displayed on the screen 1 by the execution of the application program. The broadcasting information is provided through the GUI 3 of the application program.

When adjustment conditions of a predetermined image are satisfied during the execution of the application, the controller 130 temporarily pauses the execution of the application program and controls the signal processor 120 so that the video is adjusted.

In other words, the user does not need to terminate the application program to adjust the video.

Figure 3:
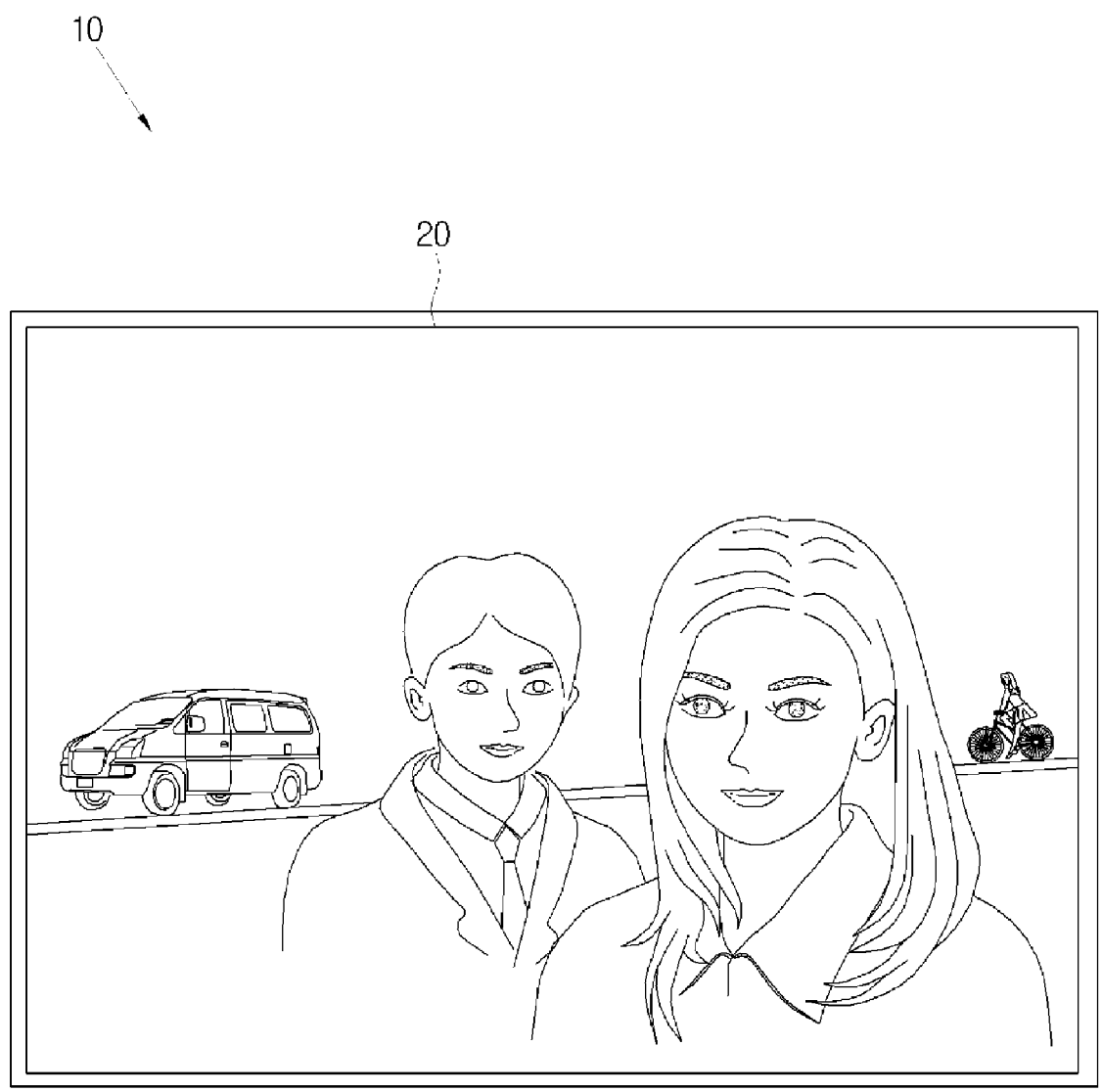
FIG. 3 shows a screen of the broadcasting signal processing apparatus according to the exemplary embodiment of the present invention.

The controller 130 can control the signal processor 120 so that, for example, the size of the video is adjusted. For example, when the video 2 is displayed on a portion of the screen 1 together with the GUI 3 of the application program, the controller can control the signal processor 120 so that the size of the video 2 is adjusted. Therefore, the video 20 can be displayed over the entire screen 10 as shown in FIG. 3.

The user can determine whether the adjustment conditions of the video are satisfied during the execution of the application program. That is, the broadcasting signal processor 100 may further include a user input unit 140 that receives at least one instruction of the user to adjust the video. The controller 130 can determine that adjustment conditions of the video being displayed are satisfied when the user's instructions are input through the user input unit 140.

Thus, a user's preference can be better satisfied because the user is able to perform user-desired video adjustment at a user-desired time during execution of the application program.

The user input unit 140 can be provided as a remote controller (not shown) having at least one button, such as a hotkey, or as a control panel (not shown) provided in the broadcasting signal processor 100. The controller 130 determines that the user's instructions for video adjustment are input when a button of the remote controller or the control panel is pressed.

Therefore, the user can perform a convenient, user-desired video adjustment with a simple key input, like a hotkey, during execution of the application program.

The controller 130 can then resume the execution of the application program that has been temporarily paused after the video adjustment. If the execution of the application program is resumed, the controller 130 can control the signal processor 120 so that the video 20 of FIG. 3 is restored to the original state of the video (refer to video 2 of FIG. 1) prior to adjustment.

The controller 130 can resume the temporarily paused application program when the user instructs the application program to resume through the user input unit 140. The instruction meaning "resume execution of the application program" can be input through a predetermined button of the user input unit 140, such as a remote controller or a control panel.

A button corresponding to the user instruction for the application program resumption may be the same as the button corresponding to the user instruction for video adjustment during execution of the application program. That is, whenever the button is pressed, the video 1 of FIG. 1 and the video 10 of FIG. 3 can be alternatively displayed.

As described, since the video can be switched from the after-adjustment state to the before-adjustment state, and vice versa, with a simple key input such as the hot key, user convenience can be improved.

Figure 4:
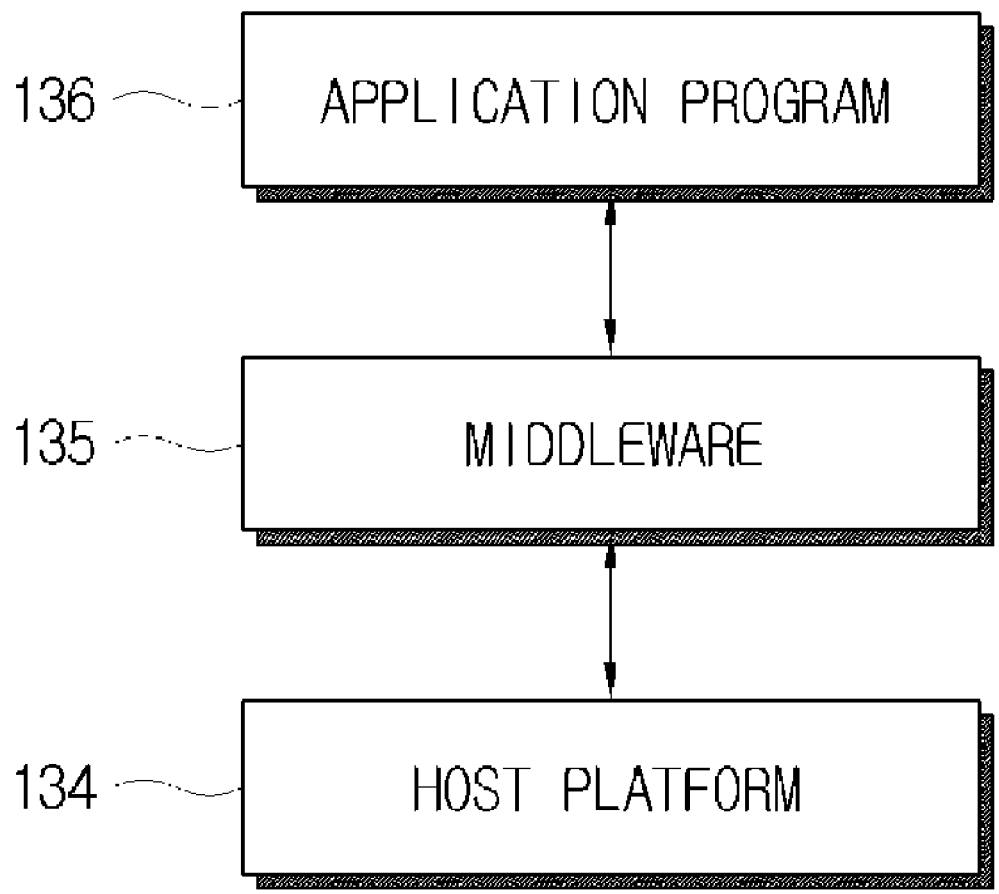
FIG. 4 shows a configuration of software for realization of a controller according to the exemplary embodiment of the present invention.

The controller 130 can be software and hardware. FIG. 4 is a block diagram of a configuration of software of the controller 130. The controller 130 may include a host platform 134 and a middleware 135, both as software.

Referring to FIG. 2, the controller 130 may include a read only memory (ROM) 131 as hardware for storing the host platform 134 and the middleware 135, a random access memory (RAM) 132 for loading the stored host platform 134 and the stored middleware 135, and a central processing unit (CPU) 133 for executing the host platform 134 and the middleware 135 that are loaded to the RAM 132. The application program 136 can also be loaded to the RAM 132 and executed by the CPU 133.

The host platform 134 includes a device driver (not shown) that controls the broadcasting signal processing apparatus 100. When the application program is executed, the middleware 135 provides an application programming interface (API) for using functions of the host platform 134. The API serves as an interface between the host platform 134 and the application program 136. The host platform 134 and the middleware 135 are programmed so that the CPU 133 performs the above-described operations of the controller 130.

Figure 5:
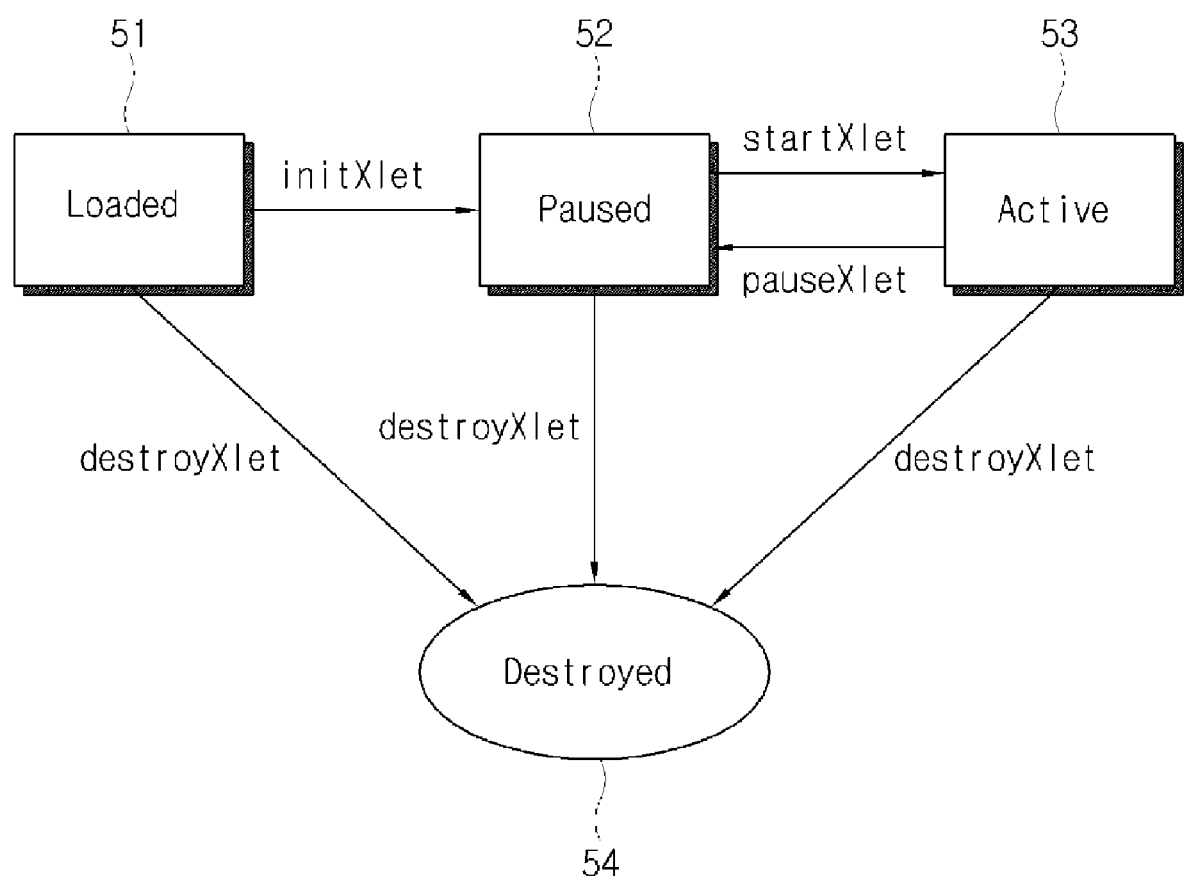
FIG. 5 is a diagram illustrating the state of the application program according to the exemplary embodiment of the present invention.

Referring to FIG. 5, execution, pause, and resumption of the application program 136 will be described in detail. FIG. 5 shows a diagram of the states of the application program 136. As shown in FIG. 5, the states of the application program 136 include a Loaded state 51, a Paused state 52, an Active state 53, and a Destroyed state 54.

The Loaded state 51 indicates that receiving of the application program 136 has been completed by the signal receiver 110. The Paused state 52 indicates that the application program 136 has been initialized and is ready for execution. The Active state 53 indicates that the initialized application program 136 is being executed. The Destroyed state 54 indicates that the application program 136 has been terminated. The Paused state 52 and the Active state 53 are examples of a pause state and an execution state, respectively, in the present exemplary embodiment.

The application program 136 has functions respectively corresponding to the states 51, 52, 53, and 54. These functions are defined in the broadcasting specifications, such as the OCAP and the MHP. That is, the application program 136 can be switched to the Paused state 52 from the Loaded state 51 by calling an initXlet function of the application program 136.

In addition, the Paused state 52 and the Active state 53 can be executed by respectively calling pauseXlet and startXlet functions, and the two states 52 and 53 can be switched to each other accordingly.

Further, the application program 136 in the Loaded state 51, the Paused state 52, or the Active state 53 can be moved to the Destroyed state 54 at any time by calling, for example, a destroyXlet function.

During execution of the application program 136, the controller 130 changes the current state of the application program 136 from the Active state 53 to the Paused state 52 by calling the pauseXlet function so as to temporarily pause the execution of the application program 136.

In addition, the controller 130 changes the current state of the application program 136 from the Paused state 52 to the Active state 53 by calling the startXlet function while the execution of the application program 136 is paused. This resumes the temporarily paused application program 136.

Referring to FIG. 2, the broadcasting signal processing apparatus 100 may further include a display unit 150 that displays images based on the broadcasting signals processed by the signal processor 120. The display unit 150 may display images by using a liquid crystal display (LCD) or a plasma display panel (PDP).

Figure 6:
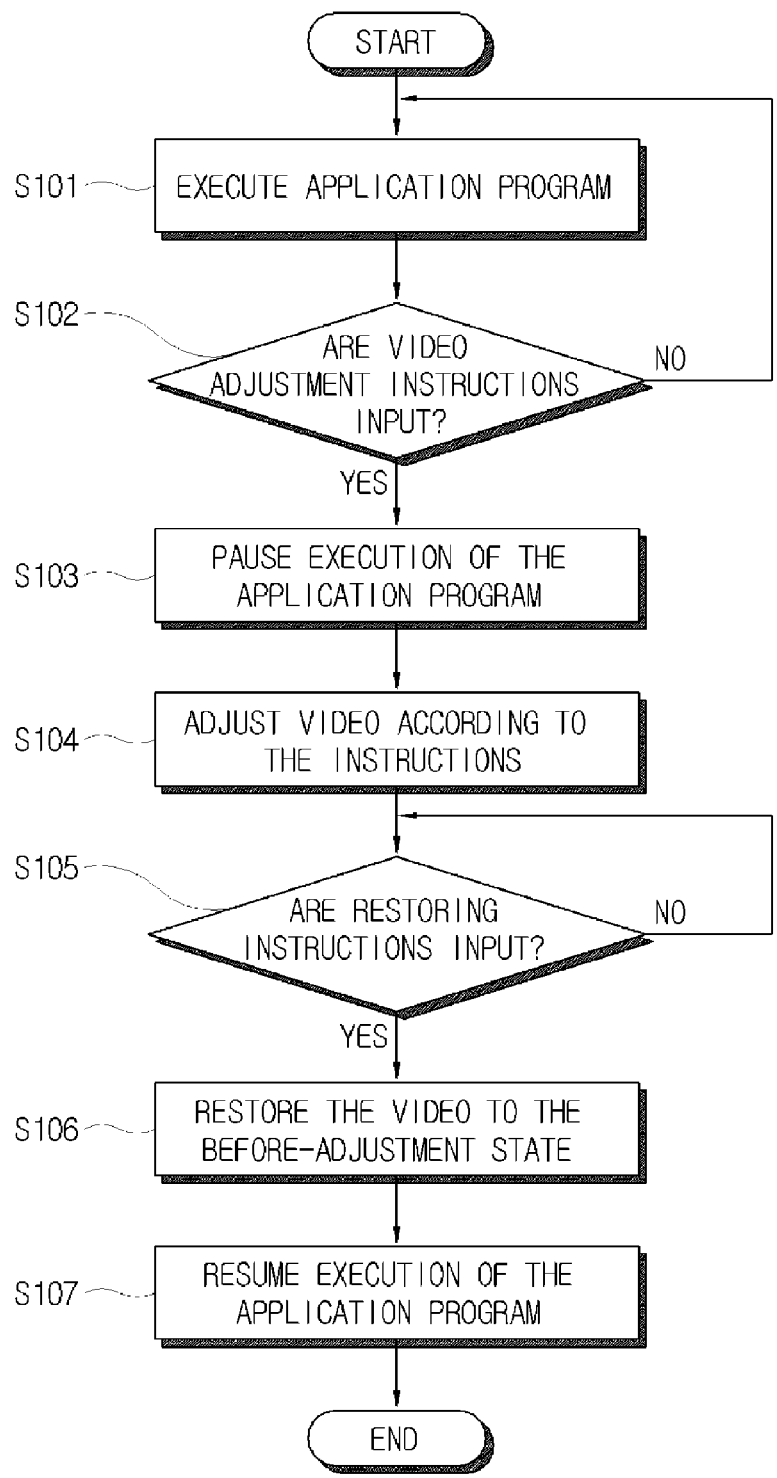
FIG. 6 is a flowchart of a control method of the broadcasting signal processing apparatus according to the exemplary embodiment of the present invention.

FIG. 6 is a flowchart of a control method of the broadcasting signal processing apparatus 100 according to the exemplary embodiment of the present invention. When receiving of the application program included in the broadcasting signal is finished, the controller 130 executes the application program, at operation of S101. When the application program is executed, as shown in FIG. 1, the video 2 and the GUI 3 of the application program can be displayed.

Subsequently, the controller 130 determines whether the user has input instructions for video adjustment, at operation of S102. The user's instructions may require maximization of the size of the video 2 of FIG. 1 to the size of the screen 1. The user's instructions may be input through a predetermined button on the user input unit 140, such as a remote controller.

When it is determined at the operation of S102 that the user's instructions have been input, the controller 130 temporarily pauses the execution of the application program, at operation of S103. For example, the controller 130 changes the current state of the application program from the Active state 53 to the Paused state 52 by calling the pauseXlet function. This temporarily pauses the application program.

Next, the controller 130 controls the signal processor 120 so that the video is adjusted according to the user's instructions, at operation of S104. For example, the controller 130 controls the signal processor 120 so that the size of the video 2 of FIG. 1 is maximized and the video 20 is displayed on the full screen 10 as shown in FIG. 3. At operation of S104, the controller 130 may hide the GUI 3 of the application program shown in FIG. 1 so as to fully display the video 20 on the screen 10.

Next, the controller 130 determines whether user's instructions for restoring the video prior to adjustment are input at operation of S105. That is, the controller 130 determines whether user' instructions for resuming the application program are input, at operation of S105.

When it is determined at operation of S105 that the user's instructions for resuming the application program are input, the controller 130 controls the signal processor 120 so that the video is restored to a before-adjustment state, at operation of S106. Restoring of the video may indicate that the size of the video 20 of FIG. 3 is adjusted to the size of the video 2 of FIG. 1.

Next, the controller 130 resumes the paused application program, at operation of S107. For example, the controller 130 calls the startXlet function of the application program in order to change the current state of the application program from the Paused state 52 to the Active state 53. Thereby, the paused application program is resumed.

When the application program is paused, the GUI 3 of the application program as shown in FIG. 1 may be displayed. The operation order of the operation of S106 and the operation of S107 may be interchanged.

As described above, a broadcasting signal processor and a control method of performing a user-desired function without terminating an application program, can be provided according to the exemplary embodiment of the present invention.

Particularly, the user can adjust the video during execution of the application program so that the user does not need to terminate the application program in order to adjust the video.

In addition, a user can be more satisfied by performing user-desired video adjustment at user-desired time during execution of the application program according to the exemplary embodiment of the present invention.

Further, user convenience can be improved by allowing the user to adjust the video to a desired state with a simple key input, like a hotkey.

Although an exemplary embodiment of the present invention has been shown and described, it will be appreciated by those skilled in the art that changes may be made in this exemplary embodiment without departing from the principles and spirit of the invention, the scope of which is defined in the appended claims and their equivalents.

What is claimed is:

1. A broadcasting signal processing apparatus comprising:
a signal receiver which receives a broadcasting signal, the broadcast signal including an application program for providing broadcasting information;
a signal processor which processes the broadcasting signal so that a video is displayed based on the broadcasting signal received by the signal receiver; and
a controller which controls the signal processor so that, if an adjustment condition of the video being displayed is satisfied while the application program is executed, execution of the application program is paused without terminating the application program and the video being displayed is adjusted while the application program is paused,
wherein the application program comprises a graphic user interface (GUI), and the application program displays the broadcasting information through providing the GUI on a display,
the GUI provided by the application program is displayed simultaneously with the video while the application program is executed, and the GUI of the application program is not displayed while the application program is paused, and
the controller changes a current state of the application program from an execution state to a pause state by calling a function of the application program that pauses the execution of the application program.

2. The broadcasting signal processing apparatus of claim 1, further comprising a user input unit to which a user's instruction to adjust the video is input,
wherein the controller determines that the adjustment condition of the video being displayed is satisfied when the user's instruction is input.

3. The broadcasting signal processing apparatus of claim 2, wherein the user input unit comprises a remote controller or a control panel, the remote controller or control panel including at least one button, and wherein the controller determines that the user's instruction is input when the at least one button is pressed.

4. The broadcasting signal processing apparatus of claim 1, wherein adjustment of the video includes adjusting a size of the video.

5. The broadcasting signal processing apparatus of claim 1, wherein, during the execution of the application program, the video is displayed on a first portion of the display and the GUI is displayed on a second portion of the display, the second portion of the display excluding the first portion of the display.

6. The broadcasting signal processing apparatus of claim 1, wherein the controller resumes execution of the paused application program.

7. The broadcasting signal processing apparatus of claim 6, further comprises a user input unit to which a user's instruction to resume the paused application program is input,
wherein the controller resumes the paused application program when the user's instruction is input.

8. The broadcasting signal processing apparatus of claim 6, wherein the controller controls the signal processor so that the video is restored prior to adjustment if the application program is resumed.

9. The broadcasting signal processing apparatus of claim 6, the controller calls a function of the application program that changes a current state of the application program from a pause state to an execution state in order to resume the paused application program.

10. The broadcasting signal processing apparatus of claim 1, further comprising a display unit which displays a video based on the broadcasting signal processed by the signal processor.

11. A control method of a broadcasting signal processing apparatus having a signal receiver that receives a broadcasting signal, the broadcasting signal including an application program for providing broadcasting information, and a signal processor that processes the broadcasting signal so that a video is displayed based on the broadcasting signal received by the signal receiver, the control method comprising:
  determining whether an adjustment condition of the video being displayed is satisfied while the application program is executed;
  pausing the execution of the application program without terminating the application program if the adjustment condition of the video being displayed is satisfied; and
  controlling the signal processor so that the video being displayed is adjusted while the application program is paused,
  wherein the application program comprises a graphic user interface (GUI), and the application program displays the broadcasting information through providing the GUI on a display, and
  the GUI provided by the application program is displayed simultaneously with the video while the application program is executed, and the GUI of the application program is not displayed while the application program is paused, and
  wherein the execution of the application program is paused by changing a current state of the application program from an execution state to a pause state by calling a function of the application program that pauses the execution of the application program.

12. The control method of claim 11, further comprising receiving a user's instruction for adjusting the video,
  wherein it is determined that the adjustment condition of the video being displayed is satisfied if the user's instruction is input.

13. The control method of claim 11, wherein the adjustment of the video comprises adjusting a size of the video.

14. The control method of claim 11, wherein, during the execution of the application program, the video is displayed on a first portion of the display and the GUI is displayed on a second portion of the display, the second portion of the display excluding the first portion of the display.

15. The control method of claim 11, further comprising resuming the execution of the paused application program.

16. The control method of claim 15, wherein the resuming of the execution of the paused application program comprises:
  receiving a user's instruction for resuming the execution of the paused application program; and
  resuming the execution of the paused application program if the user's instruction is input.

17. The control method of claim 15, wherein the resuming of the execution of the paused application program further comprises controlling the signal processor so that the video is restored prior to adjustment.

18. The control method of claim 15, wherein the resuming of the execution of the paused application program further comprises calling a function of the application program so as to change a current state of the application program from a pause state to an execution state.

19. The broadcasting signal processing apparatus of claim 1, wherein the application program comprises a list of instructions which provide a plurality of functions performed by the broadcasting signal processing apparatus which executes instructions in the list of instructions during the execution of the application program.

20. The broadcasting signal processing apparatus of claim 19, wherein the video being displayed is adjusted while the execution of the application program is temporarily paused without terminating the application program.

21. The broadcasting signal processing apparatus of claim 20, wherein the GUI provided by the application program is displayed by the broadcasting signal processing apparatus during an execution state of the application program, and the GUI of the application program is not displayed by the broadcasting signal processing apparatus during a pause state of the application program.

22. The broadcasting signal processing apparatus of claim 1, wherein the controller changes the current state of the application program from the execution state to the pause state if the controller receives an instruction of a video adjustment function which is not a function of the plurality of functions provided by the application program.

23. The broadcasting signal processing apparatus of claim 8, wherein the video being displayed is adjusted between a pre-adjusted state and an adjusted state, where the video is displayed in the pre-adjusted state while the application program is in an execution state and the video is displayed in the adjusted state while the application program is in a pause state, and the video is restored from the adjusted state to the pre-adjusted state if the application program is resumed from the pause state to the execution state.

24. The control method of claim 11, wherein the application program comprises a list of instructions which provide a plurality of functions performed by the broadcasting signal processing apparatus which executes instructions in the list of instructions during the execution of the application program.

* * * * *